United States Patent
Oba et al.

[19]

[11] Patent Number: 6,149,547
[45] Date of Patent: Nov. 21, 2000

[54] GEARSHIFT CONTROL APPARATUS FOR AUTOMATIC TRANSMISSION WHICH ALTERS PRE-INERTIA PHASE HYDRAULIC PRESSURE COMMAND PARAMETERS FOR ENGAGEMENT SIDE CLUTCH

[75] Inventors: Hidehiro Oba, Numazu; Hiroatsu Endo, Susono, both of Japan

[73] Assignee: Toyoda Jidosha Kabushiki Kaisha, Toyota, Japan

[21] Appl. No.: 09/143,658

[22] Filed: Aug. 31, 1998

[30] Foreign Application Priority Data

Sep. 5, 1997 [JP] Japan ..................... 9-240868

[51] Int. Cl.[7] ................................. F16H 61/08
[52] U.S. Cl. ........................... 477/154; 155/143
[58] Field of Search ................... 477/143, 154, 477/155; 701/58, 59

[56] References Cited

U.S. PATENT DOCUMENTS

| | | | |
|---|---|---|---|
| 4,707,789 | 11/1987 | Downs et al. | 477/155 |
| 4,943,920 | 7/1990 | Hiramatus et al. | 477/155 X |
| 5,467,854 | 11/1995 | Cregar et al. | 477/154 X |
| 5,743,826 | 4/1998 | Usuki et al. | 477/143 X |
| 5,853,349 | 12/1998 | Shimada et al. | 477/143 |
| 5,879,268 | 3/1999 | Yasue et al. | 477/143 |

FOREIGN PATENT DOCUMENTS 7-51984  6/1995  Japan .

*Primary Examiner*—Charles A Marmor
*Assistant Examiner*—Ankur Parekh
*Attorney, Agent, or Firm*—Oblon, Spivak, McClelland, Maier & Neustadt, P.C.

[57] ABSTRACT

In a gearshift control apparatus for an automatic transmission wherein the torque capacity of a release side clutch is gradually lowered, and the torque capacity of an engagement side clutch is gradually raised, whereby the release side clutch and the engagement side clutch are changed-over to effect a clutch-to-clutch gearshift; control means issues two control commands to the engagement side hydraulic control mechanism in a term which extends until an inertia phase begins since start of the gearshift control. A first hydraulic pressure command (D1) is issued for a predetermined time period. The first hydraulic pressure command (D1) is variable for adjusting the timing of the changeover between the clutches. The second hydraulic pressure command (D2) succeeding the first one is issued until the inertia phase begins. The second hydraulic pressure command is variable for adjusting the torque capacity of the engagement side clutch at the changeover. Thus, the timing of the clutch-to-clutch changeover is appropriately regulated without prolonging a gearshifting time period.

7 Claims, 10 Drawing Sheets

GEARSHIFT CONTROL APPARATUS FOR AUTOMATIC TRANSMISSION WHICH ALTERS PRE-INERTIA PHASE HYDRAULIC PRESSURE COMMAND PARAMETERS FOR ENGAGEMENT SIDE CLUTCH

BACKGROUND OF THE INVENTION

1. Field of the Invention

The present invention relates to a gearshift control apparatus for an automatic transmission wherein clutch-to-clutch gearshifting is effected.

2. Description of the Prior Art

In clutch-to-clutch gearshifting, the changeover timing of both clutches to be released and to be engaged is important. The official gazette of Japanese Patent Application Publication No. 51984/1995 discloses an example wherein, in case of a power-ON upshift, the changeover timing of both the clutches is established by subjecting the hydraulic pressure of the release side clutch to a feedback control so that the r.p.m. of an engine may become target r.p.m. on their blowing-up side (the target r.p.m. being that value of the engine r.p.m. which is somewhat greater than the synchronous r.p.m. of the lower-speed-stage side before lowering), and also by gradually raising the torque capacity of the engagement side clutch. That is, in this example, the changeover timing of the clutches is established by feedback-controlling the hydraulic pressure so that the release side clutch may continue a slight slip state.

The example is based on technical ideas as mentioned below. (1) The hydraulic pressure of the release side clutch is kept on the blowing-up side of the engine r.p.m., whereby the "tie-up", namely, the braking caused by engaging of both the engagement side clutch and the release side clutch can be prevented from occurring. (2) Since the hydraulic pressure is fed back so as to maintain the slight slip state, the excessive blowing-up of the engine r.p.m. can be prevented by the feedback. (3) When the engagement side clutch comes to have the torque capacity, the release side clutch has its r.p.m. lowered toward the synchronous r.p.m. and is naturally released owing to the feedback for keeping the "value greater" than the synchronous r.p.m., so that the changeover is smoothened.

The above control, however, involves the problem that the operation of "feedback-controlling the hydraulic pressure of the release side clutch for the target r.p.m. on the blowing-up side of the engine r.p.m." is actually very difficult.

More specifically, the clutch on the release side is held in perfect engagement (under a high hydraulic pressure) immediately after the issue of a gearshift command. When the hydraulic pressure is lowered little by little, the clutch begins to slip critically (or suddenly) at a certain point.

Therefore, when the rate of lowering the hydraulic pressure is high, the clutch slips very greatly since the beginning of the slip, to incur the phenomenon that the feedback control cannot follow up the great slip. When the feedback gain of the feedback control is heightened in order to cope with the phenomenon, hunting ascribable to an excessive correction arises easily. Since the feedback gain is greatly affected by manufactural discrepancies and secular changes, it is very difficult to set the feedback gain at an appropriate value on each occasion.

On the other hand, when the rate of lowering the hydraulic pressure is low, such drawbacks can be eliminated to some extent. In this case, however, a very long time is expended in reaching the critical point from the state of the high engagement pressure. This results in the problem that a gearshifting time period becomes extraordinarily long, so the gearshift stage intended by the driver of a motor vehicle is achieved slow accordingly.

SUMMARY OF THE INVENTION

The present invention has been made in view of the problems of the prior art as stated above, and has for its object to provide a gearshift control apparatus for an automatic transmission in which the changeover timing of both clutches can be appropriately controlled without prolonging a gearshifting time period.

According to a feature of the invention, the present invention relates to a gearshift control apparatus for an automatic transmission having a release side hydraulic control mechanism which controls a hydraulic pressure of a release side clutch, and an engagement side hydraulic control mechanism which controls a hydraulic pressure of an engagement side clutch. Herein, a torque capacity of the release side clutch is gradually lowered by the release side hydraulic control mechanism, whereas a torque capacity of the engagement side clutch is gradually raised by the engagement side hydraulic control mechanism, so that the release side clutch and the engagement side clutch are changed-over to effect a clutch-to-clutch gearshift. According to the present invention, the gearshift control apparatus comprises control means for issuing control commands for the hydraulic pressure of the engagement side clutch to the engagement side hydraulic control mechanism. In a term which extends until an inertia phase begins, the control means operates to give the engagement side clutch a first hydraulic pressure command for a predetermined time period and a second hydraulic pressure command succeeding the first one. The first hydraulic pressure command is variable for adjusting a timing of the changeover between the clutches, and the second hydraulic pressure command is also variable for adjusting the torque capacity of the engagement side clutch at the changeover.

With the prior-art method stated before, the torque capacity of the engagement side clutch is raised (as usual), and the release side clutch is subjected to the feedback control, thereby to lower the torque capacity of this release side clutch and also to adjust the timing of the changeover.

In contrast, according to the present invention, the release side clutch has its torque capacity lowered (as usual), and the two hydraulic pressure commands being variable are issued to the engagement side clutch in the term extending till the beginning of the inertia phase, thereby to appropriately raise the torque capacity of this engagement side clutch and also to control the timing of the changeover.

The first hydraulic pressure command serves chiefly to adjust a time period until which the clearances of the clutch plates of the engagement side clutch are closed, and the timing of the changeover between both the clutches is adjusted in compliance with this command. As will be explained later, the first hydraulic pressure command is made variable depending upon various ratios, in order to appropriately adjust the timing of the changeover.

The second hydraulic pressure command serves chiefly to adjust the speed of the piston of the engagement side clutch at the point of time at which the openings of the clutch plates are closed, and the torque capacity of the engagement side clutch at the changeover is adjusted in compliance with this command. As will be explained later, the second hydraulic pressure command is also made variable depending upon various ratios.

The changeover between both the clutches is substantially completed as thus far described. After the inertia phase has begun, the torque capacity of the engagement side clutch is further increased to a value corresponding to a line pressure. In the present invention, however, the aspect of the control at this step (after the beginning of the inertia phase) is not especially restricted.

In the present invention, how the hydraulic pressure of the release side clutch is lowered is not restricted, either. Since the timing of the changeover is adjusted on the engagement side in the present invention, it suffices to merely lower the release side hydraulic pressure by any usual method (not based on feedback). However, it shall not be excluded to perform a feedback control. In the case of subjecting the hydraulic pressure of the release side clutch to the feedback control, the feedback gain of the feedback control is set comparatively small because the fundamental adjustments are made on the engagement side in the present invention. Besides, it is rendered difficult by performing the feedback control to properly estimate whether or not the changeover timing is good. Therefore, in the case of subjecting the hydraulic pressure of the release side clutch to feedback control, the command values of the first and second hydraulic pressure commands should preferably be set variable depending upon ratios other than "learning".

According to the present invention, the changeover timing of both the clutches can be appropriately controlled without prolonging a gearshifting time period. Moreover, only the piston speed at the point of time at which the clearances of the clutch plates are closed can be made low by dividing the control command in two, so that a shock attendant upon a hydraulic pressure surge can be prevented from occurring (without prolonging the gearshifting time period).

BRIEF DESCRIPTION OF THE DRAWINGS

The above and other objects, features and advantages of the present invention will become more apparent from the following description of the invention taken in conjunction with the accompanying drawings, wherein like reference characters designate the same or similar part and wherein.

DETAILED DESCRIPTION OF THE PREFERRED EMBODIMENT

Now, an embodiment of the present invention will be described with reference to the drawings.

This embodiment concerns a gearshift control apparatus for an automatic transmission wherein a clutch-to-clutch control is performed by controlling clutch engagement pressures by means of duty solenoid valves.

Figure 13:
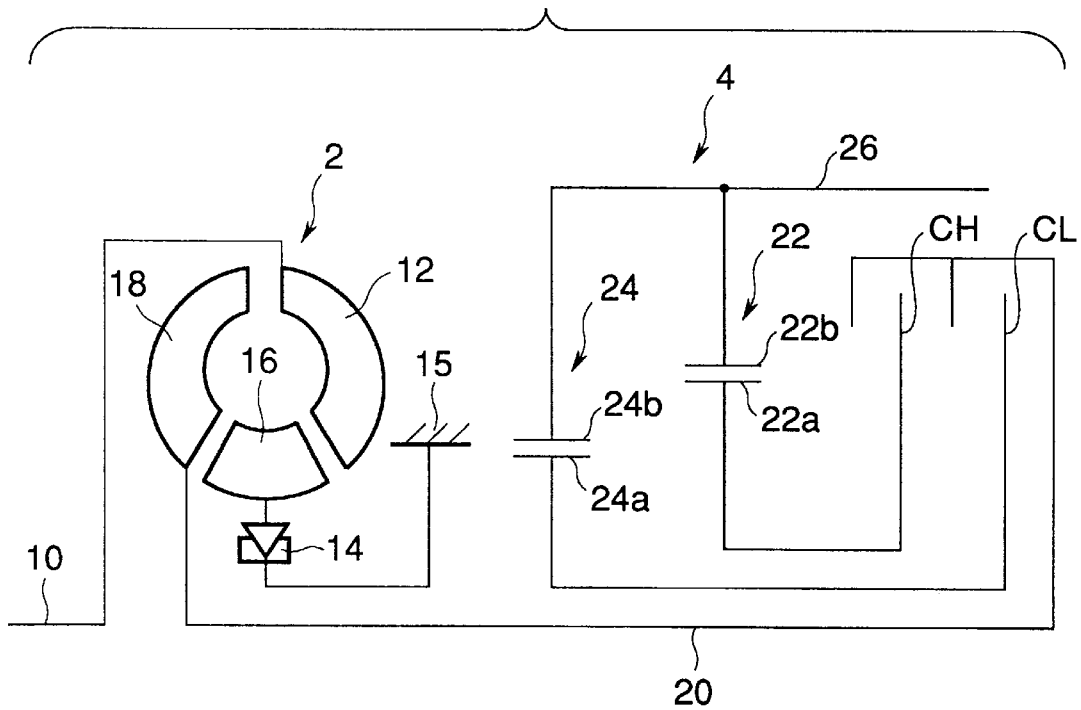
FIG. 13 is a schematic layout diagram showing the whole construction of an automatic transmission to which the present invention is applied.
Figure 13:
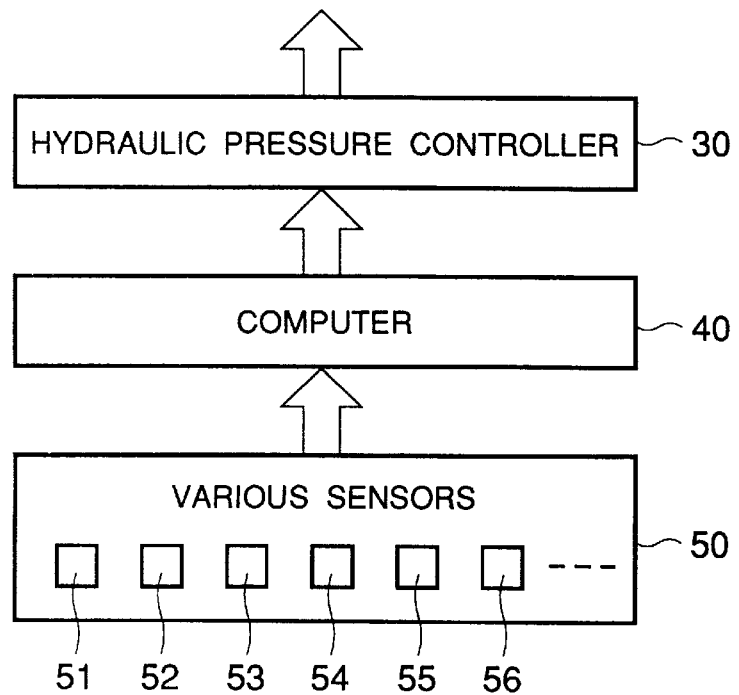

FIG. 13 is a schematic layout diagram of the construction of the gearshift control apparatus for the automatic transmission according to the embodiment of the present invention.

The automatic transmission for a motor vehicle comprises a torque converter 2 and a gearshift portion 4. The torque converter 2 includes a pump 12 which is connected with the output shaft 10 of an unshown engine, a stator 16 which is connected to the case 15 of the transmission through a one-way clutch 14, and a turbine 18. The turbine 18 is connected with the input shaft 20 of the transmission. The input shaft 20 of the transmission is connected to a high gear pair 22 through a high gear clutch CH (an engagement side clutch), and is also connected to a low gear pair 24 through a low gear clutch CL (a release side clutch). The high gear pair 22 consists of a driving gear 22a and a driven gear 22b, while the low gear pair 24 consists of a driving gear 24a and a driven gear 24b.

The driven gears 22b, 24b of the respective gear pairs 22, 24 are connected to the output shaft 26 of the transmission, and they are always rotated at the same r.p.m. (revolutions per minute).

Each of the clutches CH and CL is released or engaged in such a way that a duty solenoid valve (to be explained later) included in a hydraulic pressure controller 30 is driven on the basis of a command issued by a computer 40. Signals from various sensors 50 are inputted to the computer 40. By way of example, the signals include, not only basic signals such as a vehicle speed signal from a vehicle speed sensor 51 (the signal of the r.p.m. of the output shaft 26), a throttle opening signal from a throttle sensor 52 (the signal of the opening degree of an accelerator pedal), a shift position signal from a shift position switch 53, and a foot brake signal from a brake switch 54, but also the signal of the r.p.m. of the transmission input shaft 20 from an input-shaft speed sensor 55 (hereinbelow, the r.p.m. of the transmission input shaft shall be termed "turbine r.p.m. NT"), and an oil-temperature detection signal from an oil temperature sensor 56.

Incidentally, the "clutch" termed here signifies a clutch (a frictional engagement device) in a broad sense, and it includes both an ordinary clutch and a brake.

Figure 1:
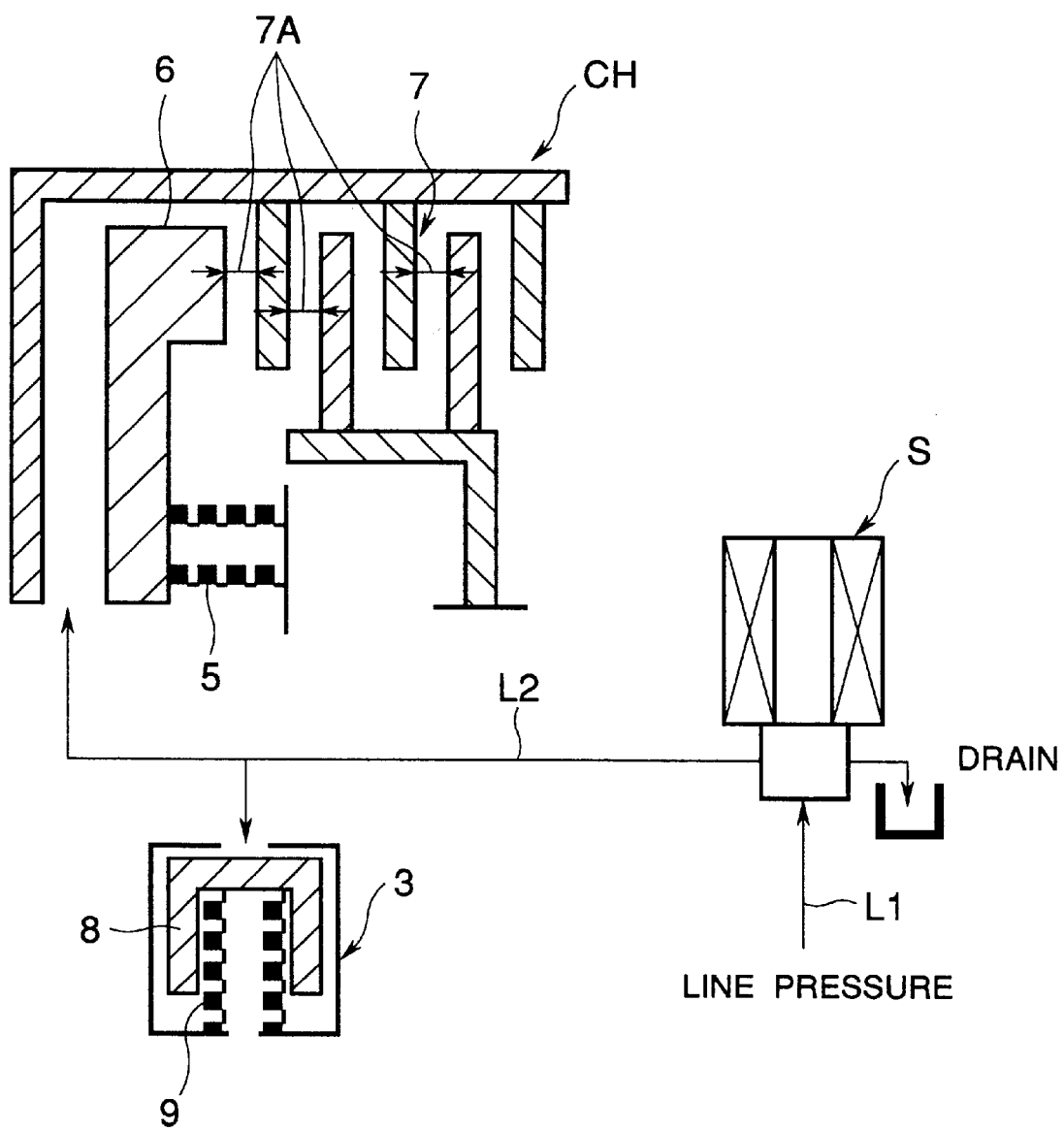
FIG. 1 is a schematic sectional view showing the construction of a hydraulic control mechanism of an engagement side clutch in an embodiment of the present invention.

FIG. 1 illustrates the construction of a hydraulic control mechanism on an engagement side. With this mechanism, a small accumulator 3 is interposed midway of an oil line L2 which joins the engagement side clutch (multiple plate clutch) CH and the duty solenoid (duty solenoid valve) S. A piston 6 is urged to its release position by the force of a return spring 5. The engagement side clutch CH brings clutch plates 7 into frictional engagement in such a way that the piston 6 is pushed to close clearances 7A of the clutch plates 7 by a clutch oil pressure supplied from the duty solenoid S. The duty solenoid S produces the predetermined control oil pressure (clutch oil pressure) on the side of the oil line L2, from the line pressure of an oil line L1 in accordance with a duty signal (=duty value or duty ratio) which is given by a controller not shown.

The small accumulator 3 includes a piston 8 on which the clutch oil pressure acts, and a spring 9 which generates a force counteracting the movement of the piston 8. Thus, the small accumulator 3 fulfills the function of preventing the sudden change of the clutch oil pressure. Therefore, the piston 8 does not reach its stroke end for the usually presumed value of the clutch oil pressure, and it is always moved halfway of its stroke in accordance with the oil pressure.

By the way, a hydraulic control mechanism on a release side may be the same mechanism as on the engagement side, or it may well be any other hitherto-known mechanism.

Besides, although the illustrated example adopts the system in which the clutch oil pressure is directly controlled by the duty solenoid S, another hydraulic control actuator (such as a linear solenoid or a 3-port pressure regulator valve) may well be used instead of the duty solenoid S.

Next, the contents of the control will be described in detail.

Figure 2:
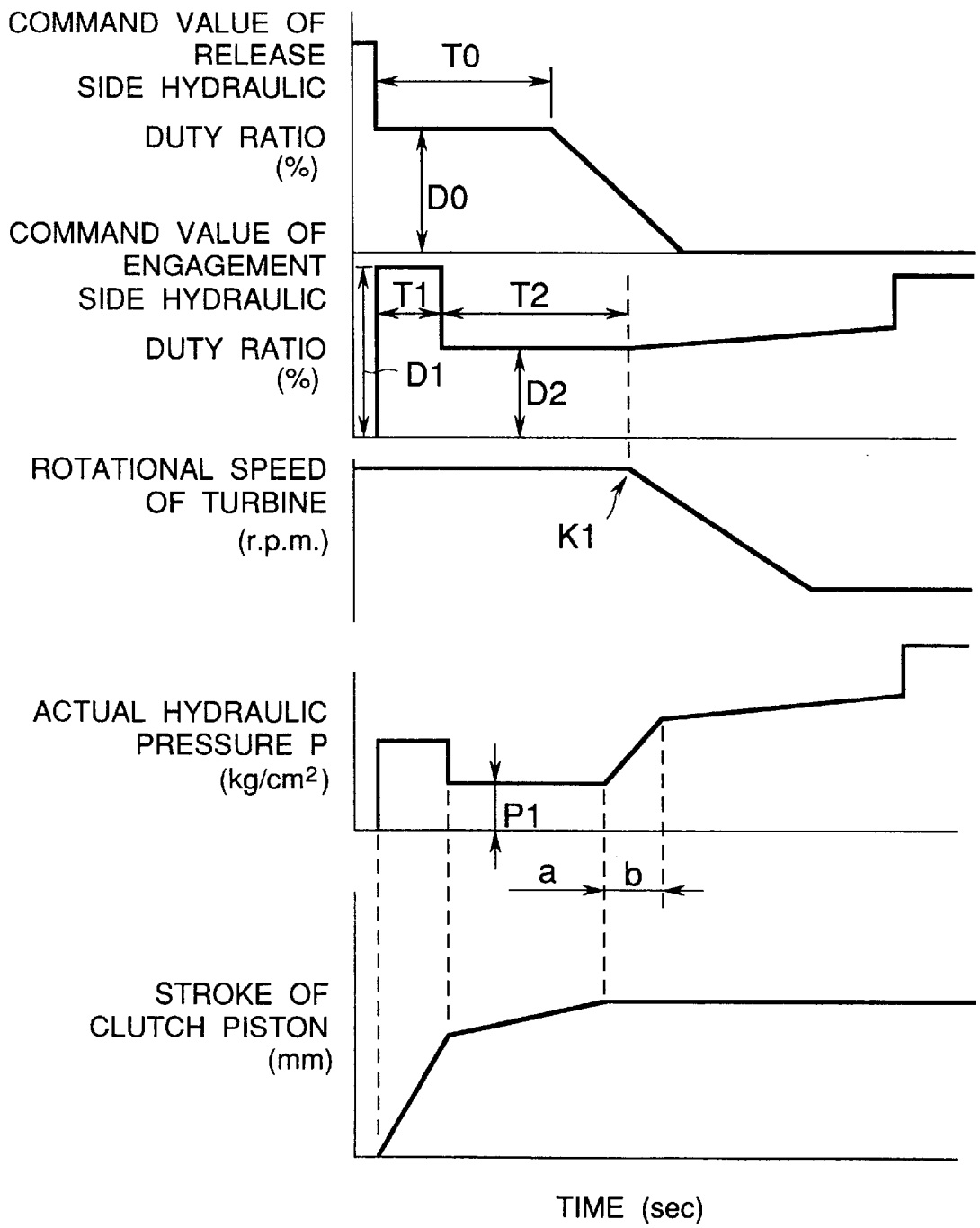
FIG. 2 is a time chart showing the first control example of a gearshift control according to the present invention.

FIG. 2 is a time chart in the case of carrying out the gearshift control.

The time chart illustrates the correlations among the command value of the hydraulic pressure of the release side clutch (=the duty ratio % which is inputted to the duty solenoid on the release side), the command value of the hydraulic pressure of the engagement side clutch (=the duty ratio % which is inputted to the duty solenoid on the engagement side), the turbine r.p.m. (=the input r.p.m. of the transmission), the actual hydraulic pressure P of the engagement side clutch, and the stroke of the clutch piston of the engagement side clutch.

When a gearshift command has been issued, the controller outputs the command value of the release side hydraulic pressure and that of the engagement side hydraulic pressure in illustrated characteristics.

Regarding the release side, upon the issue of the gearshift command, the release side duty ratio is first lowered to a value D0 of about 50%, thereby to skip down the hydraulic pressure of the release side clutch. Thenceforth, the value D0 at the skip-down is kept for a predetermined time period T0. Thereafter, the release side duty ratio is gradually lowered with a predetermined gradient until it is finally zeroized. In actuality, the hydraulic pressure of the release side clutch lowers with time in a predetermined sequence which depends upon the hydraulic control mechanism of this hydraulic pressure and which is independent of the engagement side.

Regarding the engagement side, upon the issue of the gearshift command, the controller issues a command for implementing "first quick fill (FQF)". The phrase "first quick fill" signifies an operation in which oil is quickly introduced with a duty ratio (D1) of (or near) 100% in order to close clearances defined until the clutch plates come into frictional engagement.

After the FQF has been implemented for a predetermined time period T1, the controller operates to keep a constant duty ratio D2 which is lower than in the FQF (until an inertia phase begins). Meantime, the clearances 7A are closed completely, whereupon the actual clutch oil pressure P is raised with a specific gradient by the operation of the small accumulator 3 so as to begin the engagement of the engagement side clutch CH. More specifically, in that interval a of the duration of the output of the constant duty ratio D2 which extends until the clutch clearances 7A are closed, the clutch oil pressure P is held at a value P1 which is determined by the return spring 5 of the engagement side clutch CH. When the clutch clearances have been completely closed, the clutch oil pressure P is raised in the interval b in accordance with an inclination which is determined by the spring 8 of the small accumulator 3. In the interval b, the torque capacity of the engagement side clutch CH rises to lower the turbine r.p.m. When it has been sensed that the turbine r.p.m. has begun to lower (that is, when it has been detected that the inertia phase has begun: point K1), the engagement side duty ratio is gradually raised from the value D2, or it is subjected to a feedback control so as to establish a predetermined gearshifting gradient.

In the control exemplified by the time chart of FIG. 2, within the interval T2 during which the predetermined duty ratio D2 is outputted after the implementation of the FQF, the clutch clearances 7A are completely closed, and the clutch oil pressure P begins to rise.

Consequently, the timing of the rise in the hydraulic pressure of the engagement side clutch can be determined by the extent to which the clutch clearances 7A are to be closed at the step of the FQF, and the torque capacity can be determined by the value at which the duty ratio D2 after the FQF is to be set.

In the present invention, therefore, the engagement timing of the engagement side clutch (in turn, the timing of the changeover between this engagement side clutch and the release side clutch) and the torque capacity of the engagement side clutch on the occasion of the changeover are adjusted by adjusting any of the predetermined time period T1 for implementing the FQF, the command value D1 of the FQF, and the command value D2 of the constant-duty interval which extends until the inertia phase begins after the FQF. That is, the duty ratio D1 corresponds to the command value of a "first hydraulic pressure command", while the duty ratio D2 corresponds to the command value of a "second hydraulic pressure command".

In the first control example, among the variables T1, D1 and D2, the predetermined time period T1 for the implementation of the FQF is adjusted (or varied) in accordance with the input torque of the transmission, thereby to control the timing of the rise in the hydraulic pressure of the engagement side. Concretely, the duty ratio D1 during the FQF is fixed at 100% (the fully open state of the duty solenoid valve), and the length of the predetermined time period T1 for the implementation of the FQF is adjusted (or varied) so as to become shorter for the greater input torque of the transmission. By the way, when the input torque of the transmission is great, the standing-by duty ratio D2 after the implementation of the FQF is altered and set to be somewhat greater.

Figure 3:
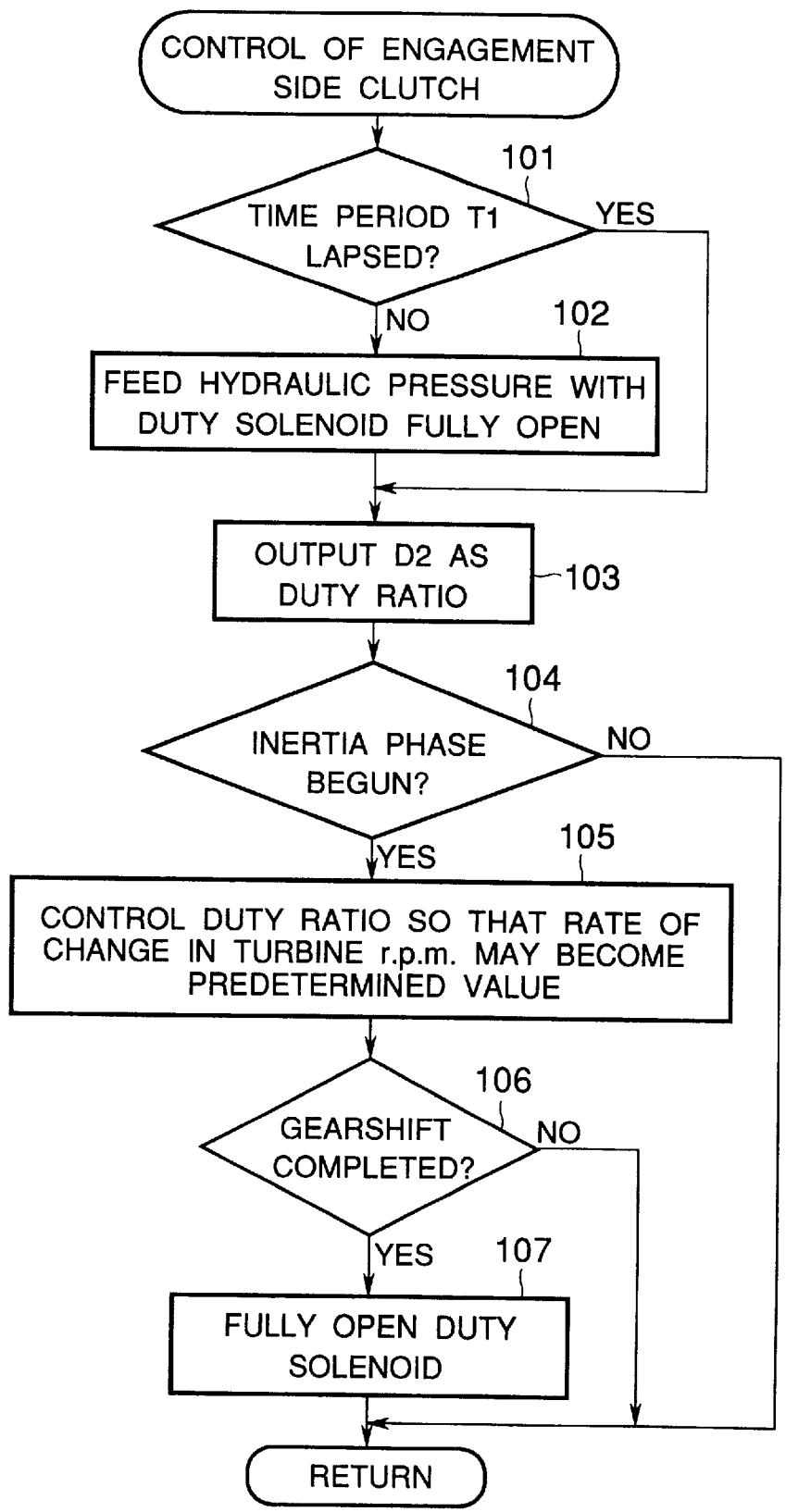
FIG. 3 is a flow chart showing the contents of the first control example illustrated in FIG. 2.

FIG. 3 illustrates the flow chart of the control of the engagement side clutch. The illustrated routine is executed every cycle of the unshown main routine of the gearshift control.

When the flow of the control has been started, the FQF is implemented for the predetermined time period T1 with the duty solenoid held fully open (at the duty ratio D1=100%), at steps 101 and 102. Subsequently, the value D2 is outputted as the duty ratio at a step 103, and this value D2 is kept until the beginning of the inertia phase is detected at a step 104. Here, the inertia phase signifies the term for which the rotary member of the automatic transmission is undergoing r.p.m. changes in order to alter a gear ratio. After the detection of the inertia phase, the duty ratio is controlled at a step 105 so that the rate of change in the turbine r.p.m. may become a predetermined value. Here, the duty ratio may be controlled by feedback, or it may well be increased with a predetermined gradient with which the rate of change in the turbine r.p.m. is supposed to become the predetermined value. Thereafter, when the completion of the gearshift has been detected at a step 106, the duty ratio is set at 100% at a step 107. Then, the process of the control is ended.

Figure 4:
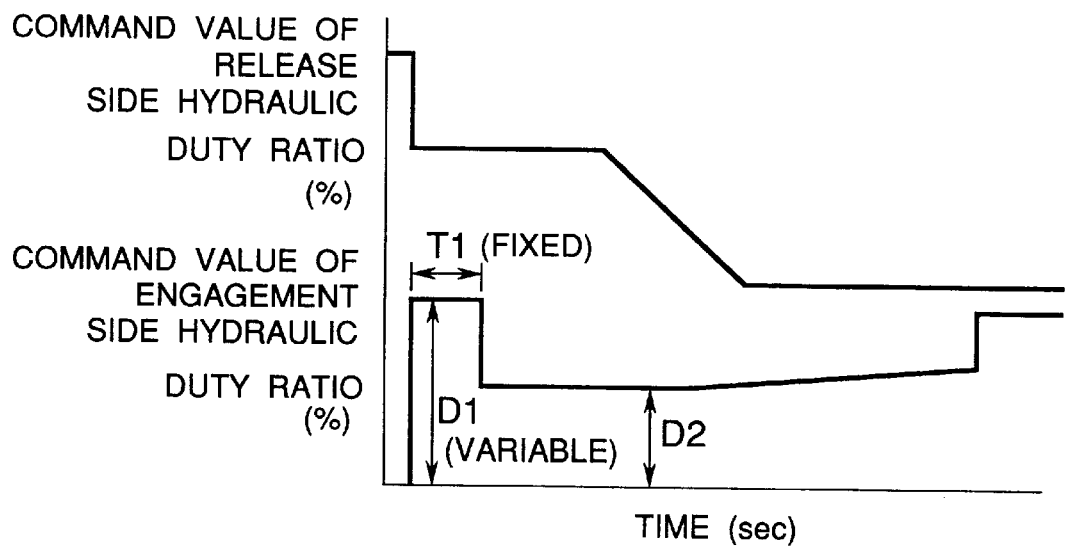
FIG. 4 is a time chart showing the second control example of the gearshift control according to the present invention.

Incidentally, a method for previously closing the clutch clearances by the FQF may well be adopted as illustrated in FIG. 4, as a second control example. Herein, the duration (the predetermined time period) T1 for which the FQF is implemented is fixed, and the duty value D1 is made variable. Of course, both the duty ratio D1 and the predetermined time period T1 may well be made variable.

Figure 5:
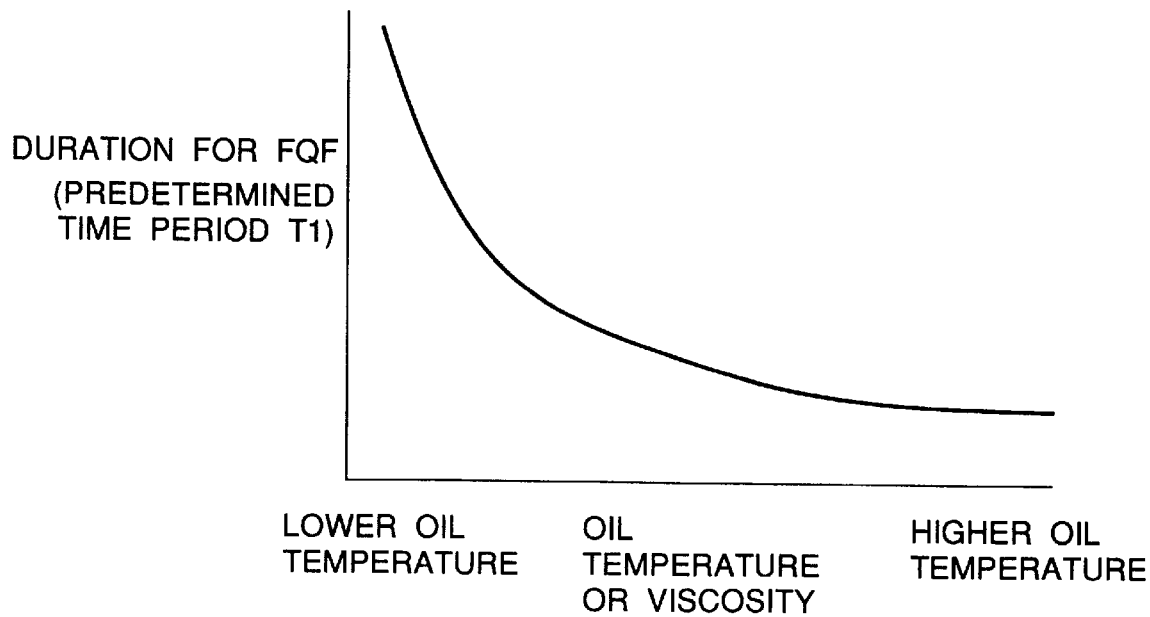
FIG. 5 is a graph for explaining the third control example of the gearshift control according to the present invention.

Also, in a case where, in order to cope with the change of the viscosity of clutch oil attributed to the change of the temperature of the clutch oil, the oil temperature is sensed so as to vary the content of the FQF in accordance with the sensed temperature, the changeover timing of the clutches can be adjusted more accurately. That is, as seen from the graph of a third control example illustrated in FIG. 5, the predetermined time period T1 is set longer at lower oil temperatures or higher viscosities, and it is set shorter at higher oil temperatures or lower viscosities. Thus, the adjustment precision of the timing is enhanced.

Further, a more appropriate control is realized in a case where the predetermined time period T1 or duty value D1 of the FQF is altered in accordance with the degree of opening of a throttle instead of the input torque of the transmission, or where the command value (standing-by duty ratio) D2 in the constant-duty interval after the FQF is altered.

Figure 6:
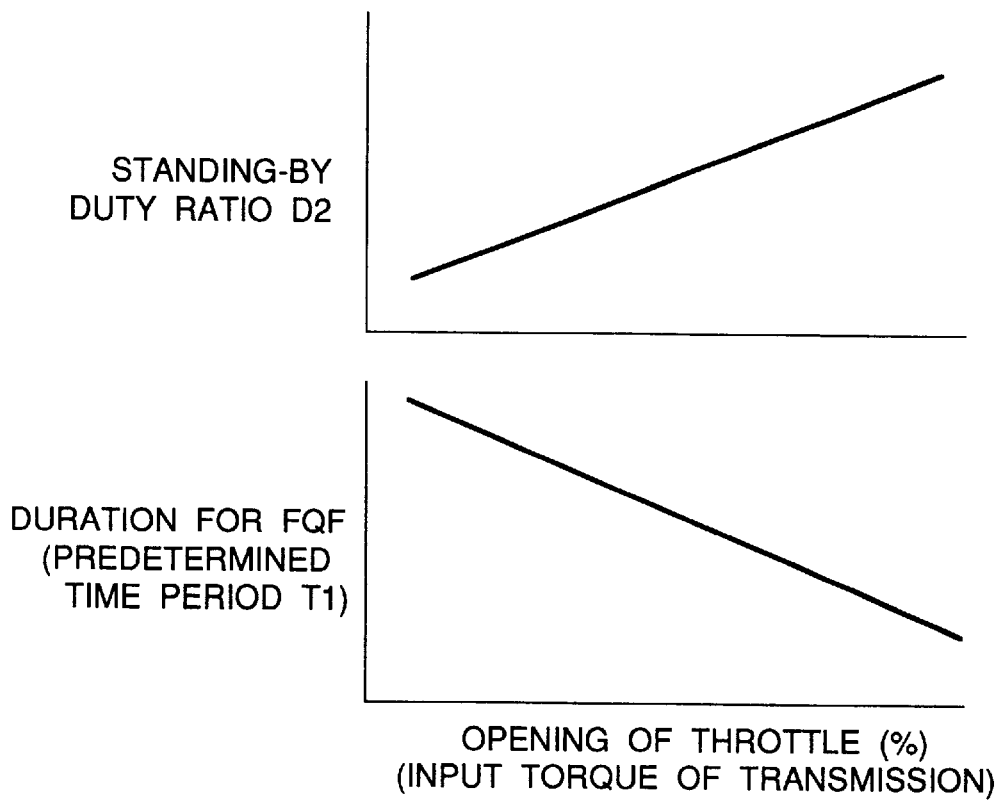
FIG. 6 is a graph for explaining the fourth control example of the gearshift control according to the present invention.

FIG. 6 illustrates such an example (a fourth control example). When the degree of opening of the throttle is lower, the predetermined time period T1 of the FQF is set longer, and the standing-by duty ratio D2 is set smaller. As the degree of opening of the throttle becomes higher, the predetermined time period T1 of the FQF is set shorter, and the standing-by duty ratio D2 is set larger. In this case, the duty ratio D1 is held fixed. The illustrated characteristics may be registered as constant maps in a computer.

In general, when the degree of opening of the throttle is higher, the input torque of the automatic transmission is greater. Therefore, the standing-by duty ratio D2 after the FQF needs to be set larger so as to enlarge the torque capacity on the occasion of the clutch engagement. As shown in FIG. 6, accordingly, the movement magnitude of the clutch piston (6 in FIG. 1) which strokes in the standing-by mode is enlarged, and the FQF duration is shortened in order to bring timings into agreement.

Such a tendency is the same as in the case of varying the predetermined time period T1 or the sustained duty ratio D2 in accordance with the input torque of the transmission. Incidentally, the input torque of the transmission may be either an actual measurement value or a torque supposed by any method.

Figure 7:
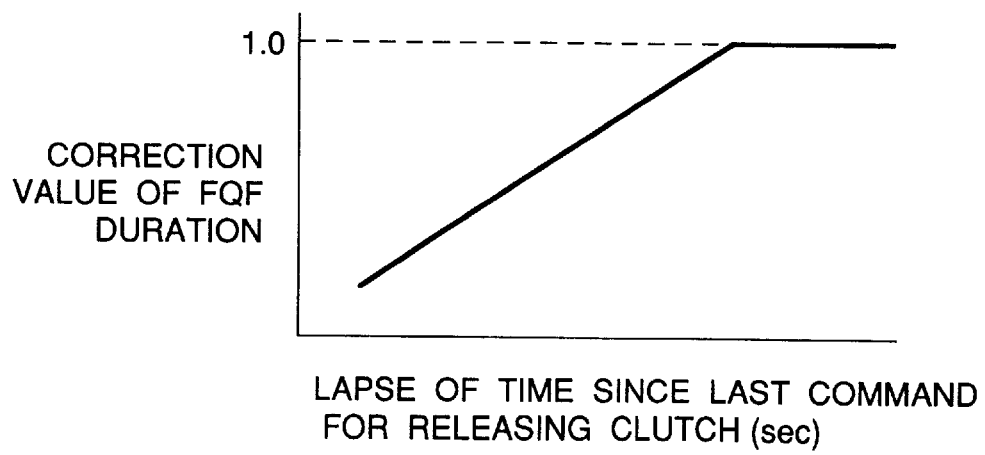
FIG. 7 is a graph for explaining the fifth control example of the gearshift control according to the present invention.

It is also allowed to measure a time period having lapsed since the timing at which a release command was issued to the engagement side clutch in a previous gearshift, and to alter the predetermined time period T1 or duty ratio value D1 concerning the FQF on the basis of the measured time period. More specifically, before the oil is completely drained after the issue of the release command, the clutch piston does not return completely, but it has some stroke. The alteration of the quantities T1 or D1 is made for the purpose of correcting the remaining stroke. FIG. 7 illustrates an example (a fifth control example) in such a case.

Figure 8:
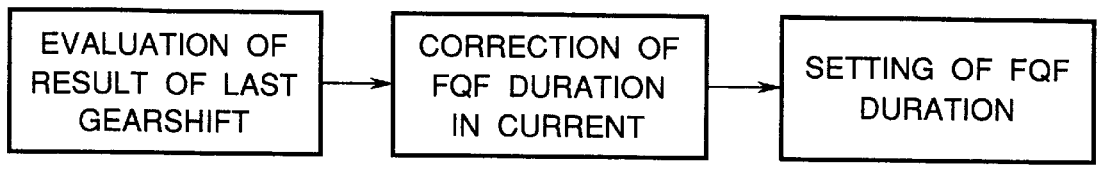
FIG. 8 is a block diagram for explaining the sixth control example of the gearshift control according to the present invention.

Alternatively, the correction magnitude of the predetermined time period T1, the duty ratio D1, or the standing-by duty ratio D2 in the constant-duty interval after the FQF is obtained on the basis of the result of a gearshift executed at the last time (or gearshifts executed at the last time and before), the obtained correction magnitude is held stored as a learned value, and the learned value is reflected in the command of a gearshift at the current time. As in a sixth control example illustrated in FIG. 8 by way of example, the control in such a case flows along (the evaluation of the result of the last gearshift)→(the correction of the predetermined time period T1 concerning the current FQF)→(the setting of the predetermined time period T1). The case of varying the duty ratio D1 or D2 can be similarly treated.

Figure 10:
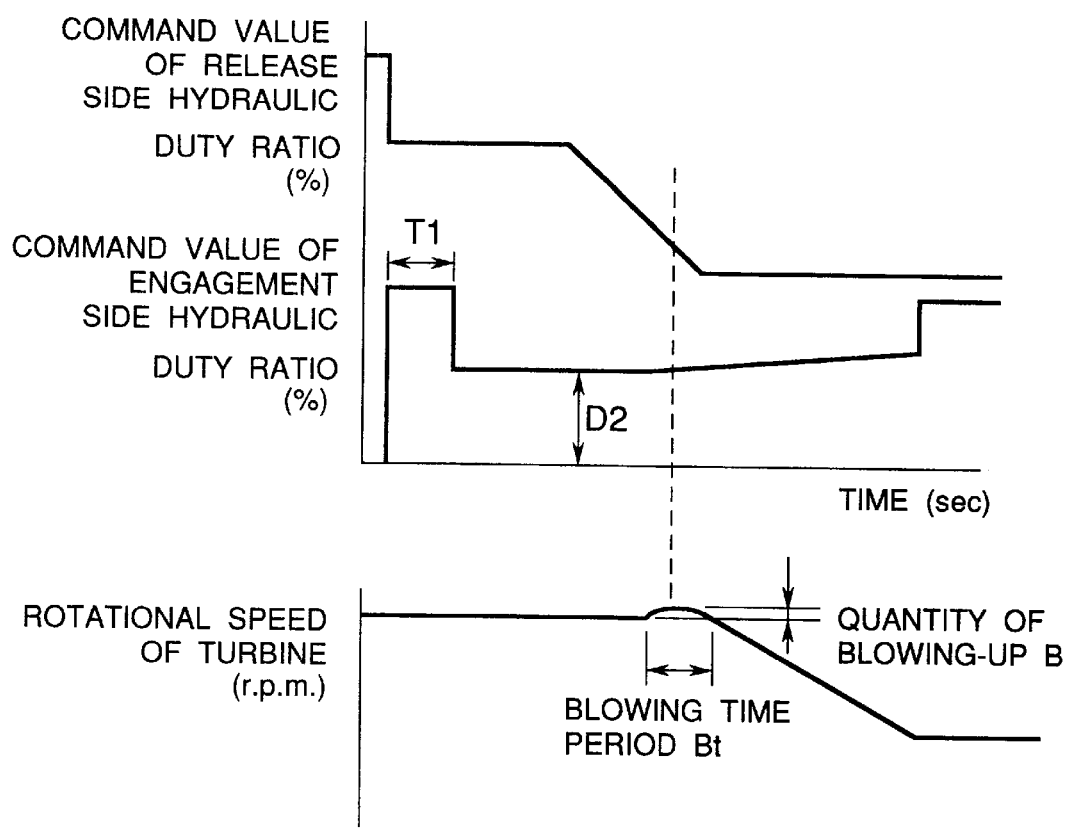
FIG. 10 is a time chart showing the seventh control example illustrated in FIG. 9.

Also allowed is to detect the blowing state of the rotation of the turbine or engine (in terms of the quantity of blowing-up B, a blowing time period Bt, or the like with respect to synchronous r.p.m. before a gearshift), and to obtain the correction magnitude of the predetermined time period T1, duty ratio D1 or standing-by duty ratio D2 in accordance with the detected value of the blowing state. The state is caused by reason that the total torque capacity of the engagement side clutch and the release side clutch is insufficient in the changeover control. Since the blowing-up quantity B of the turbine rotation can be measured at a step shown in FIG. 10 (approximately at the beginning of the inertia phase), the correction magnitude based on the measured value (of the blowing-up quantity B or blowing time period Bt) is held stored as a learnt value, which is reflected in a gearshift at the next time.

Figure 9:
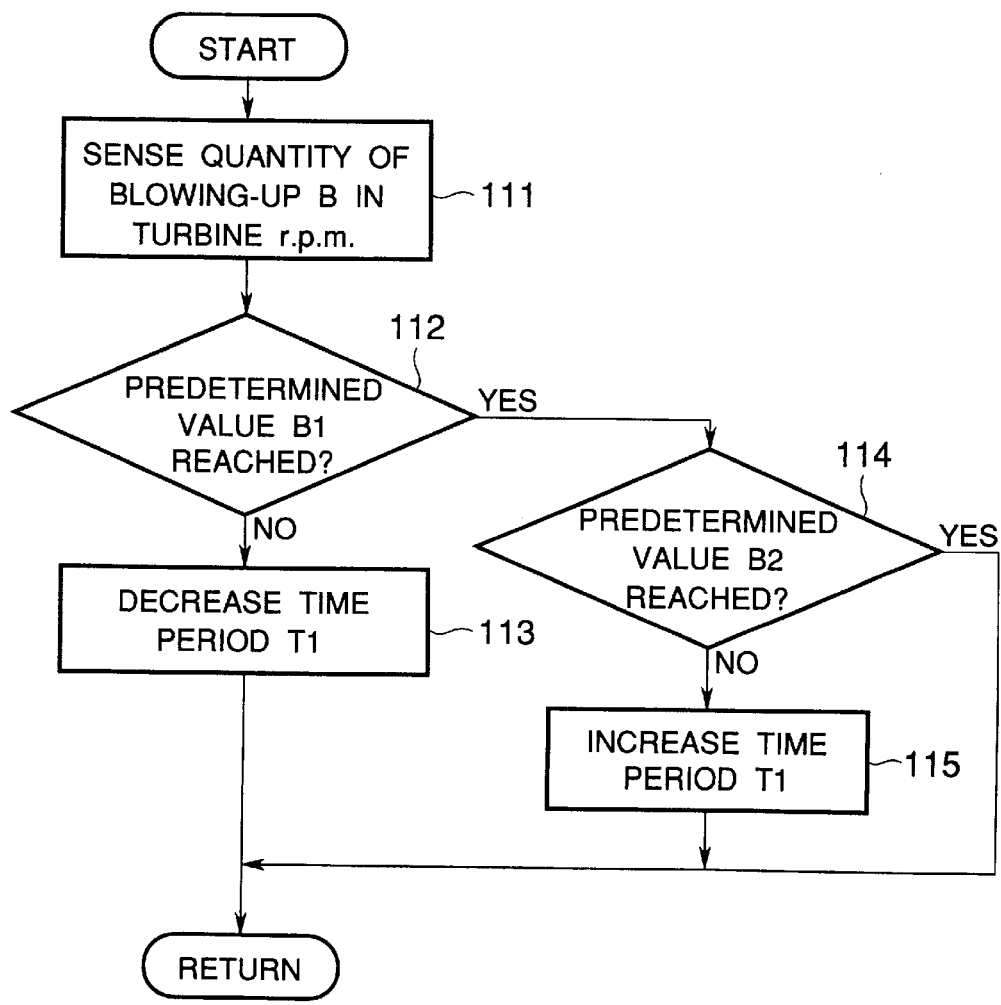
FIG. 9 is a flow chart for explaining the seventh control example of the gearshift control according to the present invention.

FIG. 9 illustrates a flow chart in such a case (as a seventh control example). In the flow of the control, the blowing-up quantity B of the turbine rotation is sensed at a step 111. If the blowing-up quantity B is less than a predetermined value B1, a step 112 is followed by a step 113, at which the predetermined time period T1 concerning the FQF is decreased. In contrast, if the blowing-up quantity B is equal to or greater than the predetermined value B1, the step 112 is followed by a step 114. The step 114 serves,to judge whether or not the blowing-up quantity B is equal to or smaller than a predetermined value B2 (here, 0<B1<B2 holds). Subject to "NO", the predetermined time period T1 is increased at a step 115, and subject to "YES", the flow advances to a return step. The duty ratio D1 or D2 can be similarly corrected.

Besides, similar corrections are possible even when the blowing-up quantity of the engine rotation is used instead of the blowing-up quantity B of the turbine rotation. Further, similar corrections are possible even when the blowing time period Bt is used instead of the blowing-up quantity B.

Figure 11:
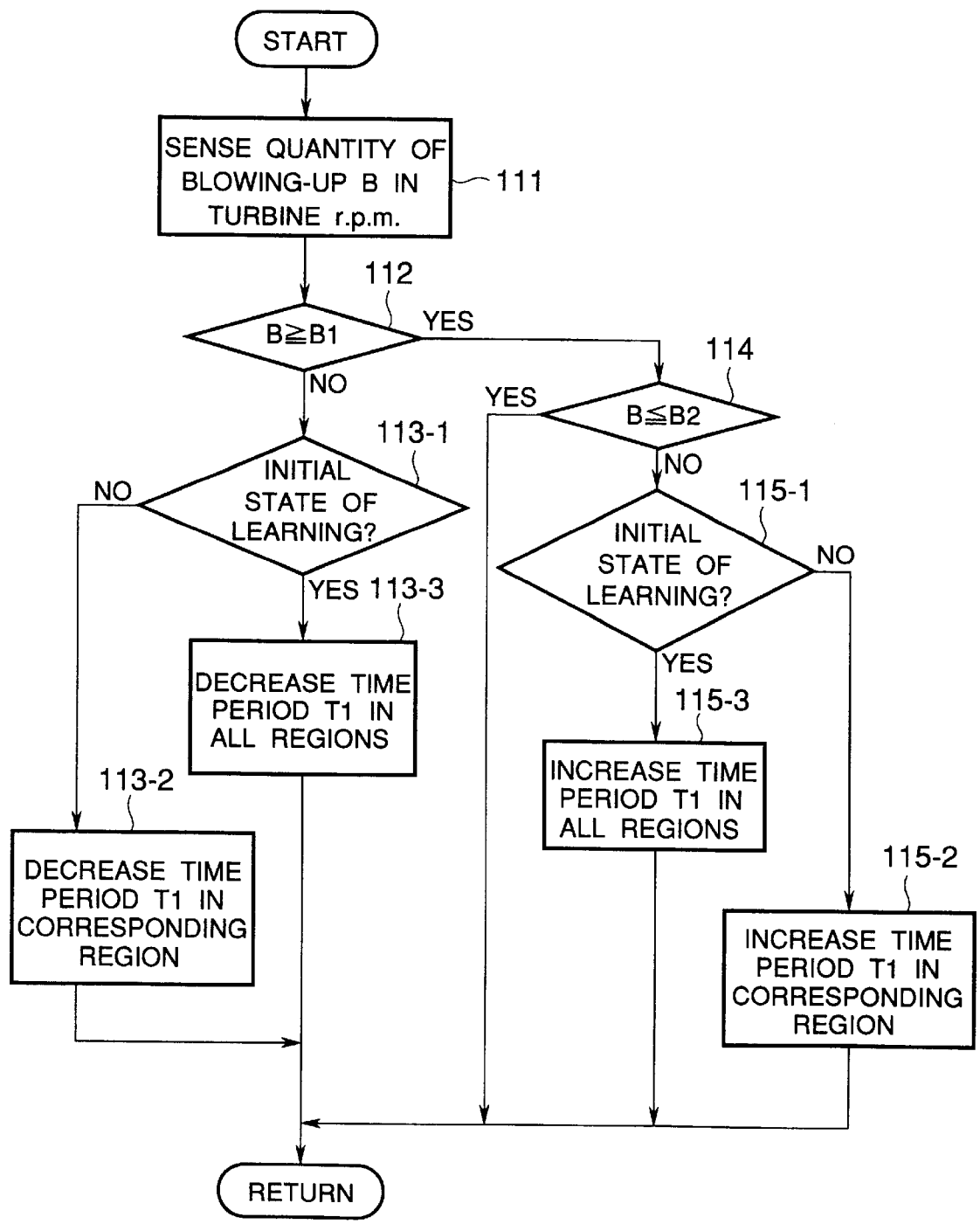
FIG. 11 is a flow chart for explaining the eighth control example of the gearshift control according to the present invention.

In an eighth control example illustrated in FIG. 11, a learned value based on the quantity of blowing-up B is reflected in all the regions of the degree of opening of the throttle or all the regions of the input torque of the transmission on the occasion of the initial state of learning (for example, the occasion where the automatic transmission has been assembled in a factory for the first time, or the occasion where a new battery has been re-connected after a learned value was erased by the disconnection of an old battery).

The points of difference from the flow illustrated in FIG. 9 are that the step 113 is replaced with steps 113-1, 113-2 and 113-3, and that the step 115 is replaced with steps 115-1, 115-2 and 115-3. Whether or not the learning is in the initial state is judged at the step 113-1. Subject to "NO", the predetermined time period T1 concerning the FQF is decreased only in the corresponding region of the input torque of the transmission (or the opening degree of the throttle) at the step 113-2. On the other hand, subject to "YES", the values of the predetermined time period T1 in all the regions are decreased at the step 113-3. The magnitudes of the decreases may be either equal in all the regions, or different in the respective regions. By way of example, it is also allowed to decrease the same certain magnitude in the directly adjacent regions, and to decrease a magnitude obtained by multiplying the certain magnitude by a predetermined ratio of 1 (one) or less, in the remoter region.

Likewise, whether or not the learning is in the initial state is judged at the step 115-1. Subject to "NO", the predetermined time period T1 is increased only in the corresponding region at the step 115-2. On the other hand, subject to "YES", the values of the predetermined time period T1 in all the regions are increased at the step 115-3. That is, the regions in which the learned value is reflected are made different, depending upon whether or not the learning is in the initial state.

In this case, this divided processing is executed one time through several times. Alternatively, it is executed until the discrepancies of the learned values become small. Thereafter, the learned values in the respective regions are reflected in only the corresponding regions. This produces the merit that the whole learning can be quickly done with a small number of times of gearshifting.

Figure 12:
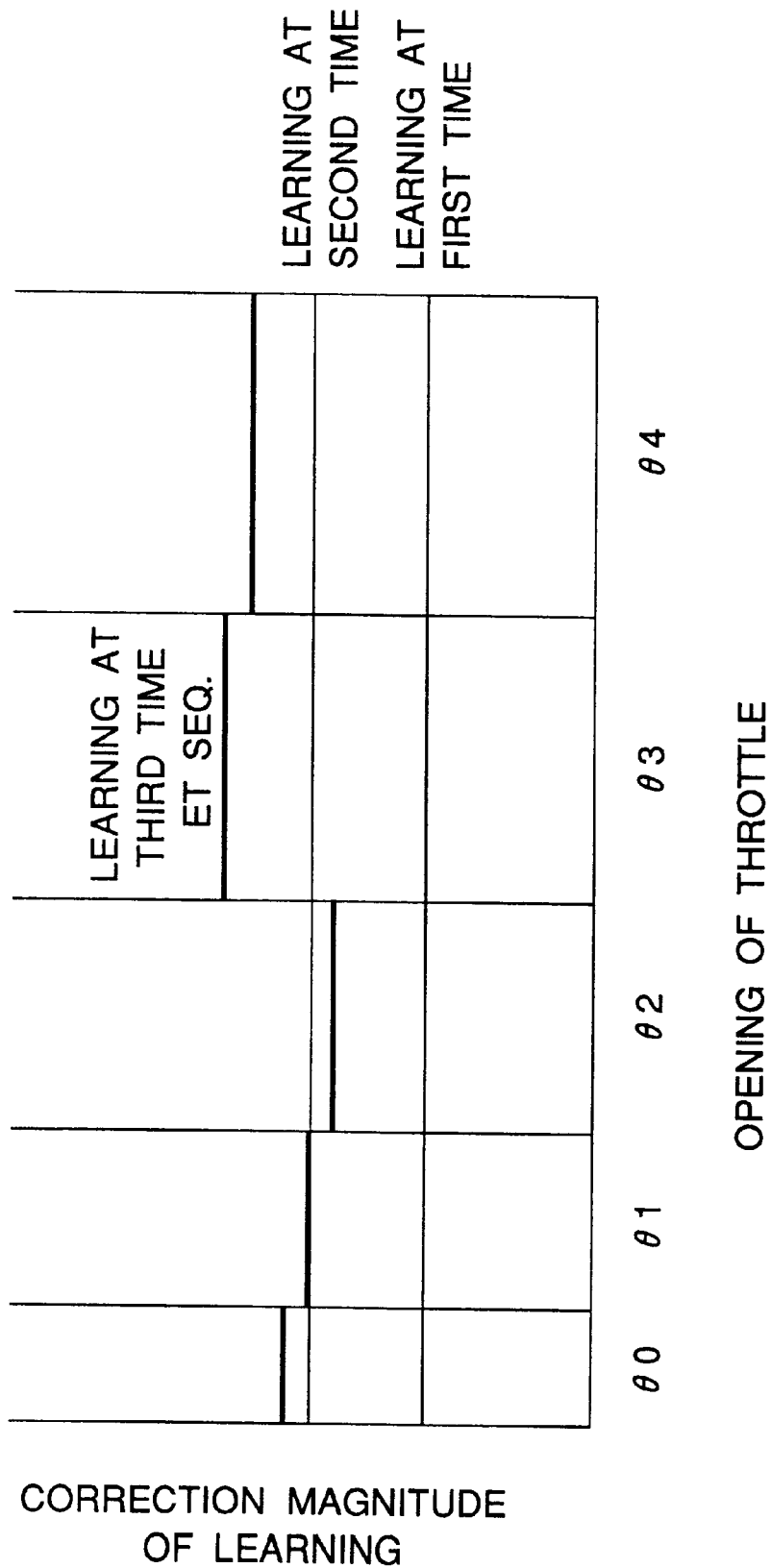
FIG. 12 is a diagram for explaining the eighth control example illustrated in FIG. 11.

In an example illustrated in FIG. 12, correction magnitudes are uniformly reflected in all of the opening degree regions of the throttle at the initial two times of learning (thin solid lines) since a state where learned values were erased. On the other hand, correction magnitudes are reflected in only the corresponding regions in which the motor vehicle was driven, at the third time of learning, et seq. (bold solid lines).

Besides, as stated before, the feedback control of the hydraulic pressure of the release side clutch, and that of the hydraulic pressure of the engagement side clutch after the beginning of the inertia phase shall not be prohibited in the present invention. In case of performing the feedback control, however, a correction based on the learning of the last gearshift lowers in reliability. It is therefore recommended that the correction based on the learning is not made at all, or is suppressed to a small correction magnitudes, when the feedback control is adopted.

As described above, according to the present invention, two variable hydraulic-pressure commands are outputted to an engagement side clutch in a time period which extends since the start of gearshifting till the beginning of an inertia phase, so that the timing of the changeover between the engagement side clutch and a release side clutch can be adjusted without prolonging a gearshifting time period. Moreover, the speed of a clutch piston at the point of time at which clutch clearances are completely closed by clutch oil can be suppressed, so that a gearshift shock attendant upon a hydraulic pressure surge can be moderated.

What is claimed is:

1. A gearshift control apparatus for an automatic transmission having a release side hydraulic control mechanism which controls a hydraulic pressure of a release side clutch, and an engagement side hydraulic control mechanism which controls a hydraulic pressure of an engagement side clutch, wherein a torque capacity of the release side clutch is gradually lowered by the release side hydraulic control mechanism, and a torque capacity of the engagement side clutch is gradually raised by the engagement side hydraulic control mechanism, so that the release side clutch and the engagement side clutch are changed-over to effect a clutch-to-clutch gearshift, comprising:

control means for issuing first and second hydraulic pressure commands for the hydraulic pressure of said engagement side clutch to said engagement side hydraulic control mechanism; wherein said control means issues said first hydraulic pressure command for a predetermined time period for adjusting a timing of the changeover between said clutches, and thereafter, issues said second hydraulic pressure command as a constant level command until the inertia phase begins for adjusting the torque capacity of said engagement side clutch at said changeover, wherein said control means alters at least one of a command value of the fist hydraulic pressure command and said predetermined time, thereby to adjust the timing of said changeover between said clutches, further comprising means for detecting a time period having lapsed since a timing at which a release command was issued to said engagement side clutch in a previous gearshift; wherein said control means alters at least one of the command value of said first hydraulic pressure command and said predetermined time on the basis of the time period having lapsed since the timing at which the release command was issued to said engagement side clutch in the previous gearshift.

2. A gearshift control apparatus for an automatic transmission as defined in claim 1, further comprising:

means for detecting an input torque of the automatic transmission;

wherein said control means alters at least one of a command value of said first hydraulic pressure command and said predetermined time, and also alters a command value of the second hydraulic pressure command, in correspondence with the input torque of said automatic transmission.

3. A gearshift control apparatus for an automatic transmission as defined in claim 1, further comprising:

means for detecting a temperature of clutch oil;

wherein said control means alters at least one of the command value of said first hydraulic pressure command and said predetermined time on the basis of the clutch oil temperature.

4. A gearshift control apparatus for an automatic transmission as defined in claim 1, further comprising:

means for obtaining a learned value on the basis of a result of estimation concerning whether or not said timing of said changeover between said clutches in a current gearshift is good;

wherein said control means corrects at least one of the magnitude of the command value of said first hydraulic pressure command and said predetermined time in a next gearshift on the basis of the learned value.

5. A gearshift control apparatus for an automatic transmission as defined in claim 4, further comprising:

means for detecting a quantity of blowing-up in engine rotation;

wherein said control means estimates whether or not said timing of said changeover between said clutches is good, on the basis of the quantity of blowing-up in the engine rotation.

6. A gearshift control apparatus for an automatic transmission as defined in claim 4, wherein the learned values are obtained for a plurality of regions of an input torque of the transmission.

7. A gearshift control apparatus for an automatic transmission as defined in claim 6, further comprising:

means for judging whether or not learning is done for the first time;

wherein when the learning is done for the first time, the learned value in one specified region is reflected in all regions.

* * * * *